United States Patent [19]
Vögtlin et al.

[11] 3,983,566
[45] Sept. 28, 1976

[54] APPARATUS FOR RECORDING OF AN ANNULAR RECORD CARRIER

[75] Inventors: Karl Vögtlin; Hans Zimmermann; Hartmut Schultze, all of Villingen-Schwenningen, Germany

[73] Assignee: Kienzler Apparate GmbH, Villingen, Germany

[22] Filed: July 9, 1975

[21] Appl. No.: 594,261

[30] Foreign Application Priority Data
July 13, 1974 Germany............................ 2433745

[52] U.S. Cl.................................. 346/44; 346/18; 346/137
[51] Int. Cl.²......................................... G01D 9/04
[58] Field of Search ................. 274/9 B, 1 R, 39 A, 274/105; 346/137, 18, 44, 145; 73/489

[56] References Cited
UNITED STATES PATENTS

| | | | |
|---|---|---|---|
| 2,739,031 | 3/1956 | Maer...................................... | 346/137 |
| 2,806,704 | 9/1957 | Burdett.............................. | 346/137 |
| 2,937,916 | 5/1960 | Hohmecher .......................... | 274/39 |
| 3,281,854 | 10/1966 | Fiehr.................................... | 274/9 B |
| 3,377,072 | 4/1968 | Gentilimi............................. | 274/9 B |
| 3,587,074 | 6/1971 | Angle................................... | 346/137 |

FOREIGN PATENTS OR APPLICATIONS
897,520  5/1962  United Kingdom............... 274/39 A

*Primary Examiner*—Harry N. Haroian
*Attorney, Agent, or Firm*—Michael J. Striker

[57] ABSTRACT

A housing of the apparatus has two sections which are relatively pivotable between an open and a closed position. A drive is provided in one of these sections for rotating the record carrier and includes a rotary support for the record carrier and a spindle which extends through a center opening of the record carrier. A self-centering element is provided in the other housing section, being mounted therein with freedom of play so that it can center itself relative to the spindle in response to movement of the housing sections towards their closed position, the element being adapted to snap in its centered position against a record carrier on the support when the housing sections move to their closed position, so that the element rotates with the support and record carrier.

13 Claims, 5 Drawing Figures

APPARATUS FOR RECORDING OF AN ANNULAR RECORD CARRIER

BACKGROUND OF THE INVENTION

Many applications are known from the prior art where an annular record carrier is rotated in correspondence with the passage of time, and wherein a sequence of events is recorded on the record carrier. Perhaps the most commonly known application is in a vehicle trip recorder which records the movements and/or stops of a vehicle throughout a certain period of time in correspondence with the passage of time. This is for instance common on commercial trucks and the like, in connection with machine tools or the like.

This type of apparatus utilizes annular record carriers of paper or the like on a surface of which a record of the sequence of events to be recorded, is traced. Such a recording has the advantage that all of the recording track is readily visible, that the record carriers can be inserted and removed from the apparatus quickly and with little difficulty, and that the recorded data are available immediately and with no problem, as opposed for example to the recording on strip-shaped record carriers with a location of a particular period in time — and of the incident recorded to have taken place in this period — is much more difficult to locate.

Apparatus of this type usually has a housing composed of two sections which can be pivoted relative to one another between an open and a closed position, the purpose being to afford ready access to the record carrier for removal of a used one and installation of a new one. If the apparatus is a trip recorder for vehicles, then one of the housing sections usually includes various elements, for example a counter which counts the distance travelled by the vehicle through the elapsed time period, a drive for rotating the annular record carrier, a clockwork for indicating the elapsed time, means for indicating vehicle speeds, motor rpm and perhaps light sources for illuminating the apparatus.

In apparatus of the type in question the annular record carriers are clamped against a rotary support which is driven in correspondence with the passage of time and which has a spindle that extends through a center opening of the annular record carrier. A particular problem of this type of apparatus results from the manner in which the record carrier is clamped to the support, especially during the replacement of record carriers and their subsequent clamping in place. The replacement of one record carrier with another must be carried out with very great care because any damage to the record carrier during installation and/or removal, for example scratches, bends or the like, will substantially and disadvantageously influence the accuracy of the recordings which can be made on the record carrier, which is particularly bothersome if the recorded information is later to be read machanically or electronically.

Various proposals have been made for clamping the record carrier onto its support with which it rotates. All of these proposals have disadvantages of one type or another. For example, the clamping uni-directional tensioning of the record carrier, causing the same either to shift out of its center position or to be deformed transversely of its center position, so that in any case the later recording track will no longer be in proper correspondence with the elapsed time. Especially if such records are then subsequently read in mechanical or electrical readers, this will result in inaccurate evaluations.

Other prior-art proposals require that the annular record carrier be placed over a member which extends through the center opening of the record carrier and is subsequently used to clamp the same in place. This, also, has various disadvantages, including the fact that it is very difficult to avoid some damage to the portion of the record carrier which borders the center opening, thus allowing the record carrier to move off-center with reference to the spindle and again permitting an eccentric track to be scribed on the record carrier. Evidently, a reference to the danger of damage to the annular record carrier is being made because it is important to realize that in the applications where such record carriers are used, the record carriers are likely to be subjected to very rough handling. In complete contradistinction to this, the prior-art proposals provide apparatus wherein the record carriers must be handled with extreme care to avoid damage to them; this is of course a factor which totally disregards the environment in which the record carriers are employed.

Still other prior-art proposals also have disadvantages which either do not clamp the record carrier in place with sufficient accuracy and/or firmness to prevent shifting of the record carrier on its support and the subsequent scribing of an improper track, or which are of such a nature that relatively high frictional momets are transmitted to the drive, the support and hence the record carrier, thus causing damage to the drive over a period of time.

SUMMARY OF THE INVENTION

Accordingly, it is a general object of this invention to overcome the disadvantages of the prior art.

More particularly, it is an object of the present invention to provide an improved apparatus of the type in question wherein the record carrier is so clamped in place on its rotary support that the drawbacks of the prior art are avoided.

An additional object of the invention is to provide such an apparatus wherein the record carrier can be clamped in place in a very simple manner and the occurrence of subjective errors, resulting from mistakes on the part of an operator, is largely avoided.

An additional object of the invention is to provide such an apparatus wherein the transmission of frictional moments resulting from the clamping of the record carrier to its support, to the drive which rotates the support, is eliminated.

Still a further object of the invention is to provide such an apparatus wherein there is no loose (and hence readily lost) clamping element present, and wherein — with the exception of the insertion and removal of the record carrier, no separate operation is required for clamping the record carrier in place.

In keeping with these objects, and with others which will become apparent hereafter, one feature of the invention resides in an apparatus wherein an annular record carrier is rotated in correspondence with the passage of time and an on-going recording is made thereon. Briefly stated, the apparatus comprises a combination of a housing having two sections which are relatively pivotable between an open and a closed position. First means is provided in one of the housing sections for rotating the record carrier; it includes a rotary support for the record carrier and a spindle which extends through a center opening of the latter.

Self-centering second means is turnably mounted in the other of the housing sections with freedom of play for centering itself relative to the spindle in response to movement of the housing sections towards the closed position, and for snapping in its centered position against a record carrier on the support when the housing sections move to the closed position, so that the second means rotates with the support and the record carrier thereon.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
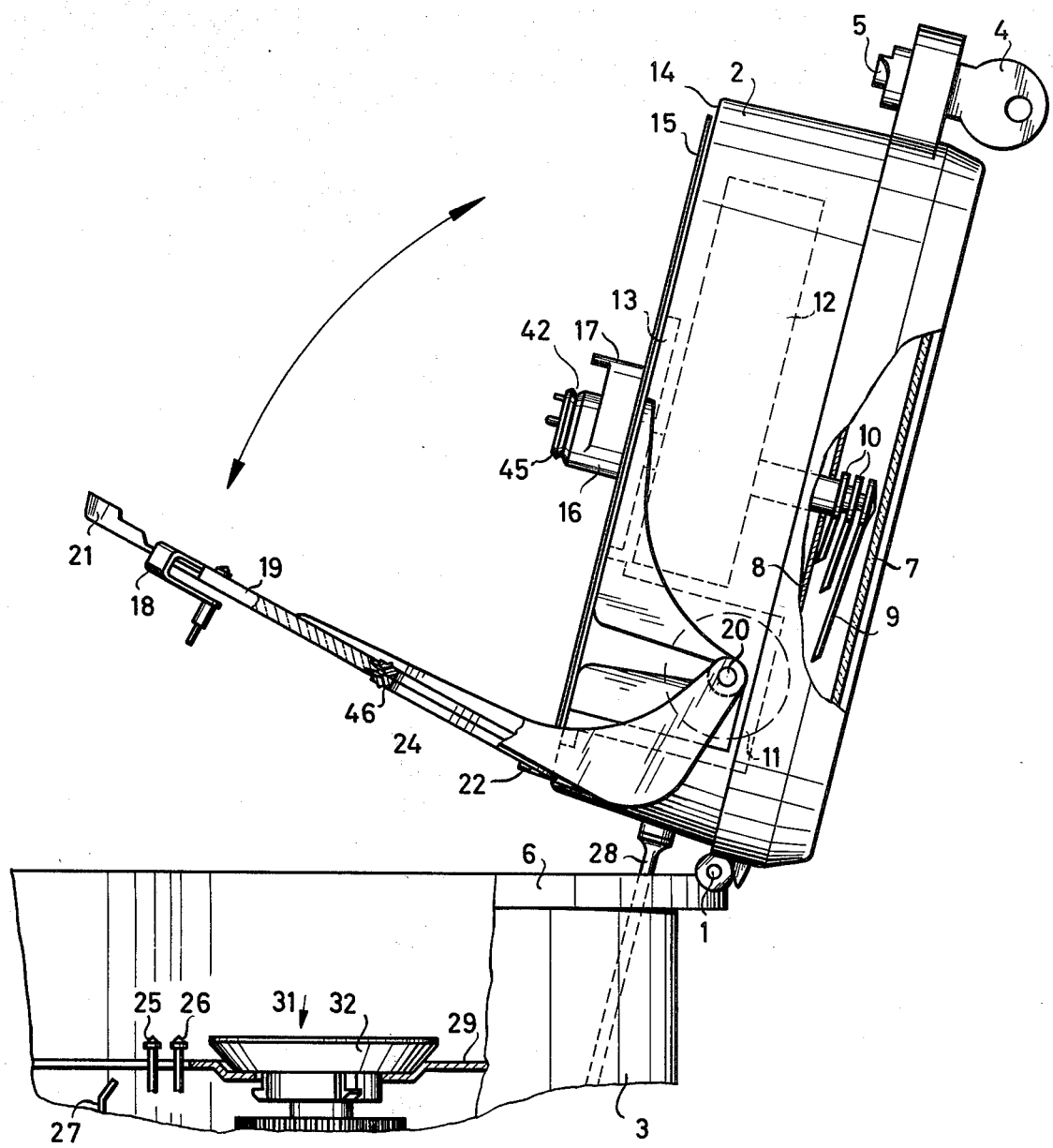
FIG. 1 is a somewhat diagrammatic fragmentary side view, partly broken away, illustrating an apparatus embodying the present invention.
Figure 2:
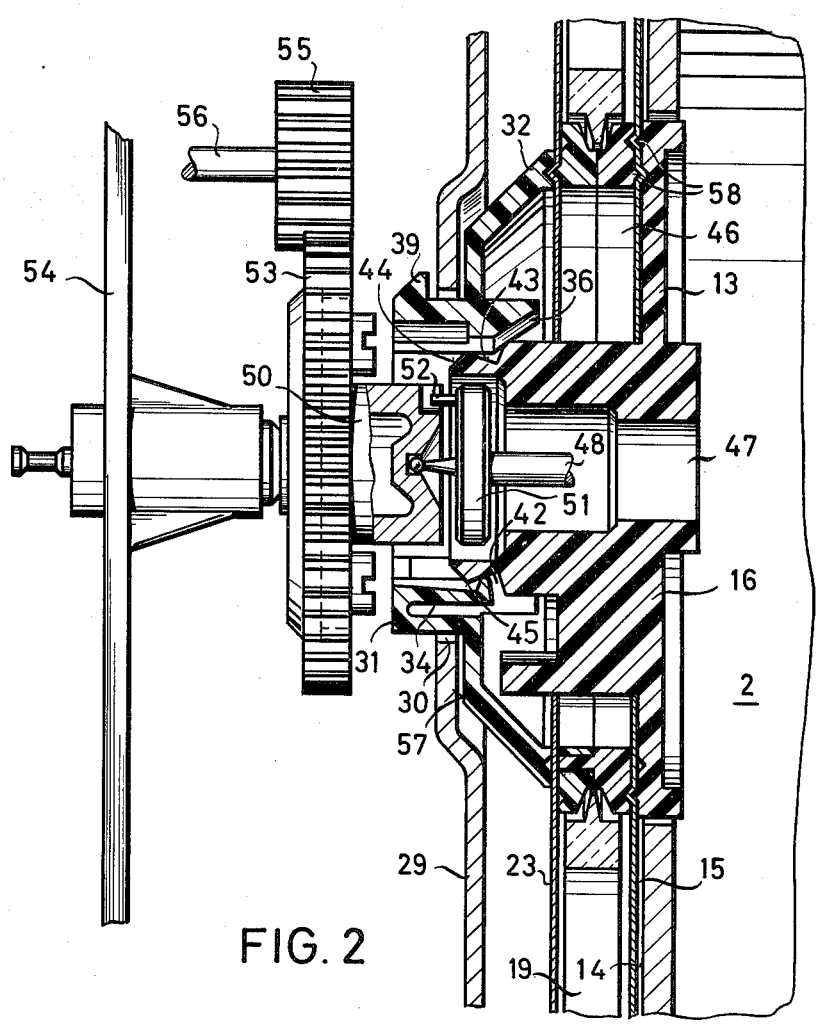
FIG. 2 is a fragmentary section, on an enlarged scale, showing a detail of the apparatus in FIG. 1 in the closed position of the housing thereof.
Figure 3:
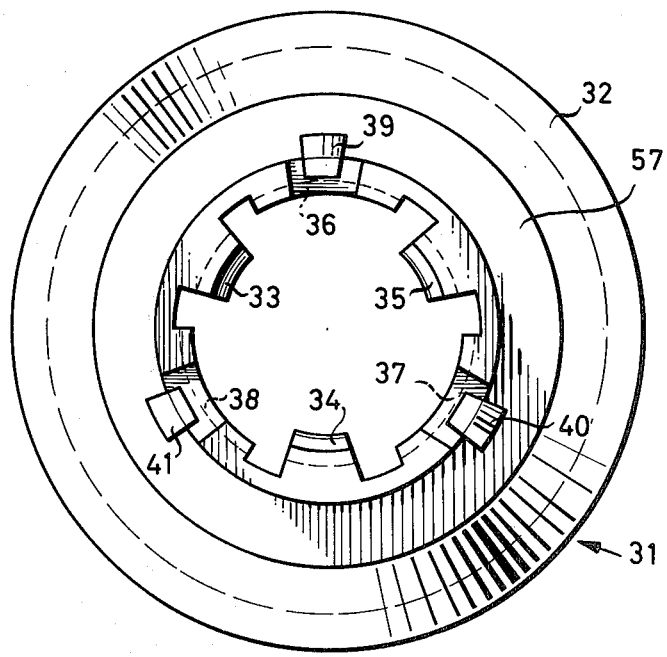
FIG. 3 is a fragmentary top-plan view of a portion of the apparatus in FIGS. 1 and 2.

FIGS. 1–3 illustrate a first embodiment of the invention. In FIG. 1 I have illustrated the invention embodied in a vehicle trip recorder which, aside from the aspects of the present invention, is known per se in the art and requires no specific detailed description. The vehicle trip recorder has a housing composed of the housing sections 2 and 3 which are connected with one another by a hinge 1 so that they can be pivoted from a closed position to the illustrated open position as indicated by the double-headed arrow in FIG. 1. The housing sections 2, 3 are substantially cylindrical of configuration and, when in closed position, can be locked together by means of a lock 5 and a key 4 which operates the same. The housing section 3 is only shown fragmentarily.

The housing section 2 is substantially cup-shaped and, when the two housing sections 2, 3 are pivoted to closed position, the housing section 2 extends relatively deeply into the housing section 3. The latter may be provided with an annular flange 6 by means of which it may be mounted on an appropriate support, for example on the dashboard of a vehicle, so that the housing section 2 can be tilted outwardly of the housing section 3 for purposes of inserting and removing annular record carriers.

The housing section 2, which may be considered as a cover for the housing section 3, in apparatus of this type usually carries the indicating means. The front of the cover 2 may be closed by a plate 7 which is transparent and of glass or synthetic plastic material and through which indicators may be viewed which move with reference to a dial 8 and of which the indicator 9 may indicate the motor vehicle speed, the indicator 10 the time, and for example other indicators the motor rpm. Also provided is a device 11 which is diagrammatically illustrated and indicates the elapsed miles or kilometers per trip. In addition, a drive 12 is provided which is shown only diagrammatically because it is known from the art and which serves to indicate the time as well as to rotate the annular record carriers 15 on which the record is to be made, and which may perform one revolution during each preset time period, for example one revolution for every 24 hours. To rotate the annular record carriers 15 the drive 12 rotates a support which is located substantially in the plane of separation of the side 14 which, when the apparatus in closed condition, faces inwardly of the housing section 3, or which may be located slightly higher than this side 14. It is the side 14 of the support 13, on which the annular record carrier 15 rests. The record carrier 15 must be centered on the side 14 of the support 13, and for this purpose the support 13 is provided with a centering spindle 16 which may be of circular cross-section and be provided with an eccentrically applied projection or nose 17, or which may be of non-round cross-section, for example of oval cross-section, of polygonal cross-section or the like. Whatever the particular configuration chosen, it thus serves not only centering purposes but also serves to entrain the record carrier 15. It will be appreciated that in all cases the cross-section of the center opening of the annular record carrier 15 must be mating to the cross-section of the spindle 16 if the latter is to act as an entraining member.

Also mounted on the housing section 2, preferably on the shaft 20 of the counter 11 which extends at opposite lateral sides outside of the housing section 2, there is a carrier element 19 which is pivotably mounted and supports a scribing device 18. This arrangement makes it possible to scribe simultaneously upon two annular record carriers, independently of one another, and the amount of work involved in replacing the record carriers with new ones is reduced to a minimum for such a construction. The scribing element 18 on the carrier element 19 serves, for example, to record the working times of a co-driver of the vehicle, or to provide a duplicate recording of one of a plurality of parameters to be recorded on the first annular record carrier 15, that is the one which faces inwardly of the housing section 2 rather than the one which faces inwardly of the housing section 3. Scribing on the front annular record carrier 15 mentioned above takes place when the carrier member 19 is pivoted downwardly as indicated by the double-headed arrow in FIG. 1. It then engages with a portion 21 on the surface 14 which acts as a writing support for the scribing element 18. Appropriate arresting devices (not shown) retain the carrier element 19 in its downwardly pivoted position, and an abutment 22 prevents the carrier element 19 from being pivoted upwardly to an excessive extent. When the carrier element 19 is pivoted downwardly, the second annular record carrier which is not visible in FIG. 1 but which is identified with reference numeral 23 in FIG. 2, and for which the carrier element 19 itself serves as a support and scribing surface, will also be centered on the spindle 16 which extends through an opening 24 formed in the carrier element 19. When the housing composed of the sections 2, 3 is closed, the record carrier 23 then can have scribed upon it (by means of scribing devices which are provided in the housing section 3 and of which a device 25 is shown by way of example for scribing the vehicle speed and a second device 26 is shown for scribing the miles or kilometers travelled by the vehicle. The scribing devices 25 and 26, a coupling lever 27 and a shaft 28 which serves to drive the counter, extend through a cap 29 which is provided in the housing section 3 and which is conventionally used in all vehicle trip recorders of this type. The coupling lever 27 cooperates with a drive in the housing and serves to transmit movements to the scribing element 18 provided on the carrier element 19. The purpose of the cap is to separate measuring devices or other components which are provided in the interior of the housing section 3, and which are not shown because they do not form a part of the invention and are conventional in this type of vehicle trip recorder, from that portion of the housing section 3 which must necessarily be exposed when record carriers are to be replaced with new ones, so as to protect the measuring devices or other components against accidental or purposfull damage or tampering.

According to the present invention the cap 29, which is fixedly mounted in the housing section 3, is provided with an opening 30 in which a clamping member 31 is mounted with relatively substantial freedom of axial and radial play. To put this another way: the clamping member 31 is loosely mounted in the opening 30 of the cap 29. It is preferred but not absolutely necessary that the clamping member 31 be produced by injection molding out of an elastically yieldable material, for example a synthetic plastic material such as polyvinyl chloride, polyethylene or the like. As FIGS. 2 and 3 show, the clamping member 31 has a substantially sleeve-shaped hub on which there is formed an annular flange 32. The hub is also provided with a plurality of projections or claws 33, 34 and 35. The flange 32 may be formed on the hub in such a manner that it is elastically yieldable in axial direction of the hub. Provided on the inner wall of the hub, being equidistantly spaced are provided conical centering elements 36, 37 and 38. Also provided are detent members 39, 40 and 41 which extend exteriorly away from the hub. To mount the member 31 in the opening 30 it is simply pushed into this opening so that the members 39, 40 and 41 become deformed until they travel through the opening and then snap out behind the cap 29, as shown in FIG. 2. Of course, the members 39, 40 and 41 must be elastically yieldable for this purpose, being appropriately configurated and of course also being inherently elastic because of the elastic characteristic of the material from which the member 31 is made. The claws 33, 34 and 35 of the member 31 cooperate with an annular groove 42 which is formed in the outer circumference of the spindle 16 and which is in part bounded by a conical surface 43. A further conical surface 44 intersects with the conical surface 43 and forms therewith an annular edge 45. In addition, a spacing ring 46 is loosely turnably journalled in the opening 24 of the carrier element 19; it is composed of two ring halves which are connected together by pressing or the like when the ring 46 is installed on the carrier element 19.

A shaft 48 of the speed measuring device 49 extends through a bore 47 in the spindle 16, and coupling elements 49, 50, 51 and 52 are provided, of which the coupling element 50 is threadedly connected with a gear 53, the latter being mounted in a frame 54 which is provided in the housing section 3 and the gear 53 engaging with a gear 55 which is mounted on the shaft 56 of the not-illustrated speed measuring device, or which is an intermediate gear that is in driving connection with the shaft.

The operation of this apparatus is as follows: Assuming that new annular record carriers 15 and 23 are to be installed and the carrier 15 has been put in place on the carrier element 19 and the further record carrier 23 has been put in place, the cover 2 is closed so that the housing section 2 and 3 now form a closed housing. During the movement to closed position the spindle 16 initially comes in contact with the clamping member 31, or rather the centering elements 36, 37 and 38 thereof. During further movement of the housing sections 2 and 3 to its closed position, the shoulder 57 of the clamping member 31 engages the cap 29 and at the same time — since the clamping element 31 has substantial axial and radial play in the opening 30 of the cap 29 — the clamping member 31 centers itself on and with reference to the spindle 16. In this position the claws 33, 34 and 35 have moved into engagement with the spindle 16 and are being flexed apart by the conical surface 44. When they reach the edge 45 which is formed by the intersection of the surfaces 43 and 44, at which point the cover 2 is almost in its completely closed position relative to the housing section 3, is snapped by the cooperation of the tensioned claws 33, 34 and 35 and of the conical surface 43, into engagement with the record carrier 23. Via the vlange 32 the record carrier 23, the spacing ring 46 and the record carrier 15 are therefore firmly pressed and clamped against the support 13 and held in place relative thereto. During this snapping movement the clamping member 31 moves far enough away from the cap 29 so that when the housing is completely closed it can rotate with the support 13 and the record carriers 15 and 23 which it clamps to the same, without ever undergoing any frictional contact with the cap 29. As an additional safety against relative rotation of the record carriers with reference to the other components, particularly if the spindle 16 should be of purely cylindrical cross-section, the support 13 and/or the spacing ring 46 may be provided with centering points 58 that can be inserted or formed integrally thereon. By providing a variable arrangement of such centering points, as to a different number used, a different angular arrangement, a different angular arrangement, a different diameter, separate measuring and recording ranges can be indicated on the record carriers 15, 23 by the dimples which are impressed into them via thses points 58.

When the housing section 2 or cover is opened, that is when it is pivoted out of the housing section 3 (in clockwise direction in FIG. 1) the projections 39, 40 and 41 first engage the rearwardly facing side (compare FIG. 2) of the cap 29 and during the further outward movement the claws 33, 34 and 35 slide on the surface 43 until the edge 45 is reached, so that the clamping member 31 is now pulled off the spindle 16. To prevent, especially during the opening, suction or other effects, so that they can then fall off, the circumferential surface of the spindle 16 may be appropriately roughened or provided with slightly raised ribs or projections or the like. The internal diameter of the center openings in the annular record carriers 15, 23, but not sufficient to deform and damage the latter.

The cap 29 must be manufactured and/or mounted in such a manner that it is relatively resistant to axially acting forces (for this acting leftward or rightward in FIG. 2) but it is also possible to mount the clamping member 31 in an appropriately constructed bracket or other member instead of the cap 29.

Figure 4:
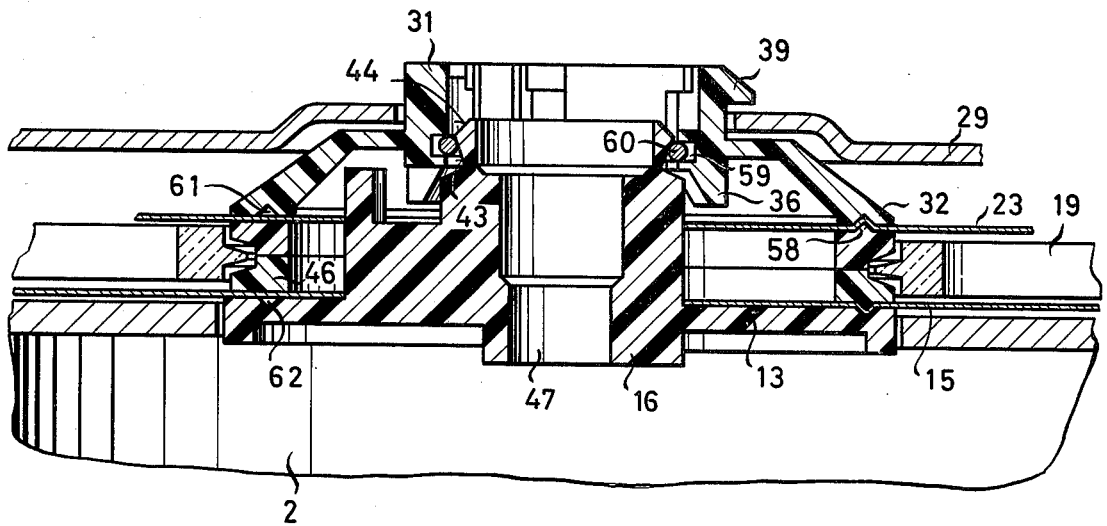
FIG. 4 is a view analogous to FIG. 2, but illustrating a further embodiment of the invention.

FIG. 4 shows a further embodiment of the invention which is largely analogous to the one in FIGS. 1–3. The embodiment in FIG. 4 differs from that in FIGS. 1–3 in that in place of the claws 33, 34 and 35 the clamping member 31 is provided with a groove 59 in which a spring ring 60 is received. In other respects the embodiment of FIG. 4, is the same as in FIG. 2. Grooves 61 and 62 are formed in the support 13 and the annular flange 32, respectively, and serve the purpose on the one hand to prevent a damage of the points 58 which are formed at least on the spacing ring 46, and on the other hand are to assure a large-area abutment of the spacing ring 46 and the tensioning member 31 on the support 13, and thus to provide a large-area clamping effect with respect to the annular record carriers 15 and 23.

Figure 5:
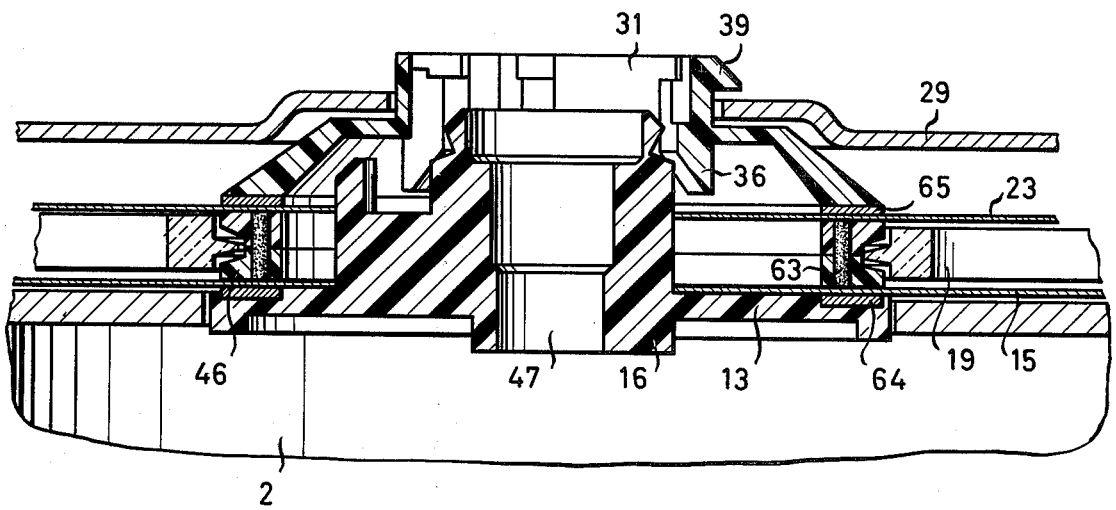
FIG. 5 is a view similar to FIG. 4, illustrating an additional embodiment of the invention.

The embodiment of FIG. 5 utilizes magnitism for clamping the record carriers 15 and 23. The clamping member 31 itself is mounted again in the same manner as described with respect to FIG. 2. The embodiment of FIG. 5 has the advantage that the spacing ring 46 can act as a magnet or a magnet carrier, in that it is either of a magnetic material itself or is so constructed that a plurality of magnets 63 can be mounted on or in the ring 46. The ring 46 cooperates with rings 64, 65 of magnetically attractable material which are provided on the support 13 and on the clamping member 31, or the annular flage 32 thereof. When the carrier element 19 is moved onto the cover or housing section 2, the record carrier 15 is held due to the magnetic attraction between the ring 46 and the ring 64. When the cover 2 is closed and moved into the housing section 3, the clamping member 31 is attracted and the record carrier 23 is then also clamped. The arrangement of the magnets can also be selected otherwise than illustrated, for example in such a manner that they are provided in the support 13 or in the clamping member 31. This is necessary in such instances if the apparatus is intended for only a single record carrier and the carrier element 19 and the spacing ring 46 are therefore not present. In an embodiment constructed according to the principle of FIG. 5 the claws 33, 34 and 35 can be omitted, but if desired they can be provided as sintering and guide elements, but would then be very highly flexible since they have no snap-action function.

A further embodiment of the invention, which is not illustrated because it can be readily understood, suggests that the clamping member 31 need not be mounted in the cap 29 or in a wall portion which is fixedly mounted in the housing section 3, but instead could be mounted on a carrier element which could be pivoted manually, for example analogous to the carrier element 19 and which could, even, be mounted pivotally on the shaft 20. Such an embodiment would of course again require an additional operation for the clamping of the annular record carriers, but it would have the advantage that no changes would have to be made in the cap 29 of an existing apparatus and no steps would have to be taken to prevent the record carriers 15, 23 from being stripped off the spindle 16 during opening or closing of the housing sections 2, 3.

It will be appreciated that although in the three embodiments the invention has been described with reference to an apparatus utilizing two (or more) annular record carriers, it is equally applicable with an apparatus using only a single annular record carrier. It will also be appreciated that it is within the perview of this invention to provide a combination of magnetic means and receiving means, such as the claws described earlier, in which case the claws 33, 34 and 35 or the spring ring 60 would have to undergo lesser stresses than if they are used by themselves, and yet optimum clamping characteristics could be obtained.

The invention is evidently also applicable in an apparatus of the type in question if the components which have been illustrated as being mounted in the cover or housing section 2, such as the dial 8 and the associated components, the drive 12 and the like, should be mounted in the housing section 3 instead, and/or if the components described as being present in the housing section 3 should be incorporated in the housing section 2.

The apparatus according to the present invention has the advantage, as compared to the prior art, that the clamping action is merely triggered by the closure movement of the housing, but that the actual clamping ultimately results due to the clamping forces of the cooperating components 16 and 31, rather than as a result of elements which are purposely pushed or otherwise forceably moved into engagement with the annular record carriers, so that the clamping action is completely free of any subjective force exerted by a user. This prevents any deformation or shifting of the annular record carriers with reference to the spindle 16, due to the fact that the element or member 31 is first precentered with reference to the spindle 16, before it moves into clamping engagement with the record carriers. Thus, an eccentric clamping of the record carriers, and the formation of eccentric recording tracks thereon which later lead to difficulties, is eliminated. Moreover, no loose parts are involved for clamping purposes as in many of the prior-art constructions, so that no parts can be lost. In addition, any transmission of stresses to the drive for the support and the record carriers, as a result of friction between the clamping device and other components, is eliminated. The clamping force can be selected within a wide range of possibilities, since the triggering moment which is produced during movement of the housing sections 2, 3 to closing position can overcome relatively high clamping forces without any difficulty, due to the lever arm which is relatively long with reference to the clamping member 31.

It will be understood that each of the elements described above, or two or more together, may also find a useful application in other types of constructions, differing from the types described above.

While the invention has been illustrated and described as embodied in an apparatus for recording on an annular turnable record carrier, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. In an apparatus wherein an annular record carrier is rotated in correspondence with the passage of time and an ongoing recording is made thereon, a combination comprising a housing having two sections which are relatively pivotable between an open position in which record carriers can be inserted into and removed from said housing, and a close position in which a recording is made on a record carrier located within the closed housing; first means in one of said housing sections for rotating the record carrier and including a rotary support for the record carrier and a spindle extending through a center opening of the latter; and self-centering second means turnably mounted in the other of said housing sections with freedom of play for centering itself relative to said spindle in response to movement of said housing sections towards said closed position, and for snapping in its centered position against a record carrier on said support when said housing sections move to said closed position, so that said second means rotates with said support and record carrier.

2. A combination as defined in claim 1; further comprising mounting means mounting said second means on said other housing section, said second means assuming during said snapping a position in which it rotates free from frictional engagement with said mounting means.

3. A combination as defined in claim 2, wherein said second means comprises a tubular hub formed with an annular flange which is juxtaposed with said support, said hub being provided with elastically yieldable inner first projections adapted to snap into an outer annular groove formed in said spindle, and with radially outwardly extending second projections engageable with said mounting means.

4. A combination as defined in claim 3, said second means being of one piece and composed of elastically yieldable material.

5. A combination as defined in claim 3, said annular flange being elastically yieldable in axial direction of said hub.

6. A combination as defined in claim 3, said second projections being elastically yieldable and arranged to cooperate with a snap-action with said mounting means.

7. A combination as defined in claim 1, said other housing section having a body formed with a hollow, and a cover member for said hollow which can be pivoted to and from a position overlying the hollow; and mounting means on said cover member for mounting said second means therein.

8. A combination as defined in claim 1, said other housing section comprising a member which is pivotably mounted on one of said housing sections; and mounting means on said member for mounting said second means thereon.

9. A combination as defined in claim 8; further comprising a distance counter in said one housing section and having a shaft; and wherein said member is mounted on said shaft.

10. A combination as defined in claim 1, said spindle having an outer circumferential groove, and said second means comprising a spring having radially deflectable arms and being adapted to snap into said groove.

11. A combination as defined in claim 1, wherein said support comprises axially oriented magnets, and said second means comprises a hub adapted to receive said spindle and formed with an annular flange which is provided with an annulus of magnetically attractable material.

12. A combination as defined in claim 1, said apparatus being adapted to record also on an additional annular record carrier located in a plane parallel to the first-mentioned record carrier; further comprising a spacer ring of magnetic material located between the record carriers, and rings of magnetically attractable material on said support and said second means, respectively.

13. A combination as defined in claim 1; and further comprising magnetic means and spring means operative for effecting said snapping of said second means.

* * * * *

UNITED STATES PATENT AND TRADEMARK OFFICE
CERTIFICATE OF CORRECTION

PATENT NO. : 3,983,566
DATED : September 28, 1976
INVENTOR(S) : Karl Vögtlin et al It is certified that error appears in the above-identified patent and that said Letters Patent are hereby corrected as shown below:

[73] The name of the Assignee should read

Kienzle-Apparate GmbH

Signed and Sealed this

Twenty-first Day of December 1976

[SEAL]

Attest:

RUTH C. MASON
*Attesting Officer*

C. MARSHALL DANN
*Commissioner of Patents and Trademarks*